United States Patent
Stoner et al.

(10) Patent No.: US 6,225,641 B1
(45) Date of Patent: *May 1, 2001

(54) OPTICAL READER FOR SCANNING OPTICAL INDICIA BY MOVEMENT OF AN APERTURE RELATIVE TO AN IMAGE PLANE

(75) Inventors: Paul D. Stoner, North Canton, OH (US); Michael D. Rainone, Arlington, TX (US); Michael David Tocci; Nora Christina Tocci, both of Albuquerque, NM (US); John Dee German, Cedar Crest, NM (US)

(73) Assignee: Telxon Corporation, Akron, OH (US)

( * ) Notice: Subject to any disclaimer, the term of this patent is extended or adjusted under 35 U.S.C. 154(b) by 0 days.

This patent is subject to a terminal disclaimer.

(21) Appl. No.: 09/262,504

(22) Filed: Mar. 4, 1999

Related U.S. Application Data (63) Continuation-in-part of application No. 08/946,028, filed on Oct. 7, 1997, now Pat. No. 5,949,068.

(51) Int. Cl.[7] ............... G06K 7/10; B01D 59/44; H01J 3/14
(52) U.S. Cl. ............... 250/568; 250/566; 250/281; 250/235; 250/234
(58) Field of Search ............... 250/566, 568, 250/281, 234, 235

(56) References Cited

U.S. PATENT DOCUMENTS

| | | |
|---|---|---|
| 3,453,419 | 7/1969 | Torrey . |
| 3,636,317 | 1/1972 | Torrey . |
| 3,812,325 | 5/1974 | Schmidt . |
| 3,860,794 | 1/1975 | Knockeart et al. . |
| 3,931,524 | 1/1976 | Herrin . |
| 4,093,865 | 6/1978 | Nicki . |
| 4,282,425 | 8/1981 | Chadima, Jr. et al. . |
| 4,387,297 | 6/1983 | Swartz et al. . |
| 5,130,520 | 7/1992 | Shepard et al. . |
| 5,484,990 | 1/1996 | Lindacher et al. . |
| 5,815,300 | 9/1998 | Ohkawa et al. . |
| 5,949,068 * | 9/1999 | Stoner ............... 250/234 |

* cited by examiner

*Primary Examiner*—Georgia Epps
*Assistant Examiner*—Michael A. Lucas
(74) *Attorney, Agent, or Firm*—Renner, Otto, Boisselle & Sklar LLP (57) ABSTRACT

An optical reader for reading optical indicia which includes an imaging element for forming an image of the optical indicia at an image plane. The optical reader further includes an aperture positioned at the image plane and having a width smaller than the width of a smallest element in the image to be discerned by the optical reader, the aperture permitting illumination from a portion of the image to impinge upon a photodetector. The optical reader further includes a displacement system which produces relative movement between the image and the aperture to produce an output of the photodetector indicative of the optical indicia.

14 Claims, 12 Drawing Sheets

OPTICAL READER FOR SCANNING OPTICAL INDICIA BY MOVEMENT OF AN APERTURE RELATIVE TO AN IMAGE PLANE

CROSS-REFERENCE TO RELATED APPLICATIONS

This is a continuation-in-part of application U.S. Ser. No. 08/946,028 now U.S. Pat. No. 5,949,068, filed on Oct. 7, 1997, and entitled "Optical Reader for Scanning Optical Indicia By Way Of Varying Object Distance".

TECHNICAL FIELD

The present invention relates generally to optical readers, and more particularly to image-based optical readers for scanning and decoding optical indicia such as bar code symbols and the like.

BACKGROUND OF THE INVENTION

Optical readers for scanning and decoding bar code symbols are generally known. A typical optical reader scanning system includes a light source, such as a laser, for providing a light beam; and an optical system for scanning the light beam in a predetermined pattern throughout a defined scanning region. In addition, the scanning system includes a detection system for detecting light having at least a predetermined intensity reflected from the bar code symbol and for providing an electrical signal in response to detection of such reflected light. Moreover, an optical system is included for directing light from the scanned light beam that is reflected from the bar code symbol to the detection system.

Recently, optical readers using one-dimensional and two-dimensional multi-photosensor array charge-coupled devices (CCDs) have become more and more prevalent. The multi-photosensor array CCDs are used to image an entire bar code symbol, and the resultant electronic image is then processed using pattern recognition techniques to decode the bar code symbol.

Both laser-based optical readers and CCD-based optical readers perform adequately. However, laser-based optical readers at times experience regulatory problems, can draw an unacceptable amount of electrical power and are subject to strict optical alignment requirements. CCD-based optical readers are at present still too expensive to enjoy widespread usage and have a very limited depth of field. The CCDs themselves are relatively expensive. In addition, significant computational power is required to decode in a timely manner.

In view of the aforementioned shortcomings associated with current optical readers, there is a strong need in the art for an optical reader which does not suffer from some of the same drawbacks as conventional optical readers. For example, there is a strong need in the art for an optical reader which does not require a laser or a CCD. Moreover, there is a strong need in the art for an image-based optical reader which is able to image and decode the bar code symbol even over a wide range of object distances between the optical reader and the bar code symbol.

SUMMARY OF THE INVENTION

According to one aspect of the invention, an optical reader is provided for reading optical indicia. The optical reader includes an imaging element for forming an image of the optical indicia at an image plane. The optical reader further includes an aperture positioned at the image plane and having a width smaller than the width of a smallest element in the image to be discerned by the optical reader, the aperture permitting illumination from a portion of the image to impinge upon a photodetector. Moreover, the optical reader includes a displacement system which produces relative movement between the image and the aperture to produce an output of the photodetector indicative of the optical indicia.

To the accomplishment of the foregoing and related ends, the invention, then, comprises the features hereinafter fully described and particularly pointed out in the claims. The following description and the annexed drawings set forth in detail certain illustrative embodiments of the invention. These embodiments are indicative, however, of but a few of the various ways in which the principles of the invention may be employed. Other objects, advantages and novel features of the invention will become apparent from the following detailed description of the invention when considered in conjunction with the drawings.

DESCRIPTION OF THE PREFERRED EMBODIMENTS

The present invention will now be described with reference to the drawings, wherein like reference labels are used to refer to like elements throughout.

Figures 1, 2:
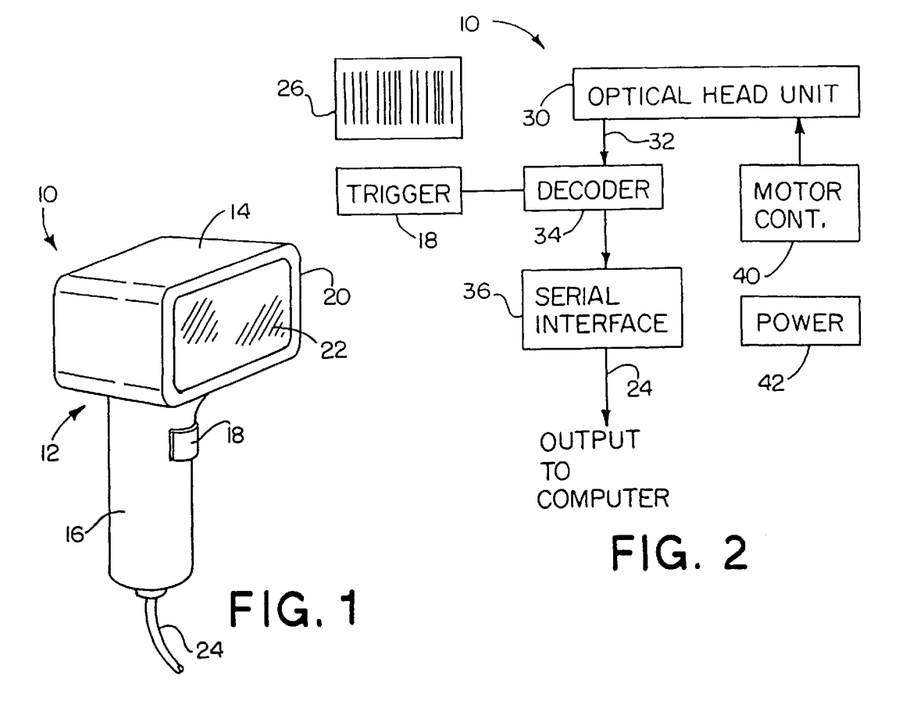
FIG. 1 is a perspective view of an optical reader in accordance with an embodiment of the present invention.
FIG. 2 is a system level block diagram of the optical reader in accordance with the present invention.

Referring initially to FIG. 1, an optical reader in accordance with the present invention is designated generally at 10. The optical reader 10 in the exemplary embodiment includes a portable, hand-held sized housing 12 which contains the optics and electronics for the reader as described below in connection with FIGS. 2 and 3. The housing 12 includes a main head unit 14 fixedly attached to a handle portion 16. The handle portion 16 is sized to allow an operator to grasp the optical reader 10 in one hand and point the optical reader at some type of optical indicia such as a bar code symbol. The handle portion 16 includes a trigger 18 which can be depressed by the finger of an operator for initiating a scanning operation.

The front of the main head unit 14 includes an aperture 20 covered by a protective window 22 such as glass or the like. The front of the main head unit 14 is pointed in the direction of the bar code symbol or other optical indicia to be read. As will be described in more detail below in connection with FIG. 3, the bar code symbol or other optical indicia is imaged through the window 22 by an imaging lens within the optical reader. The optically transparent window 22 functions to protect the housing 12 from dust or debris, while permitting light from the bar code symbol or other optical indicia to pass through the window 22 so that it may be imaged by the imaging lens.

The optical reader 10 decodes the information which is read from the bar code symbol or other optical indicia. Thereafter, the optical reader 10 outputs the decoded information to a data terminal, host computer, or the like via an electrical cable 24 extending from the base of the housing 12. Alternatively, the optical reader 10 may include a radio or other wireless communication transceiver for wirelessly communicating the decoded information to a data terminal or the like.

FIG. 2 illustrates the various primary components which are found in the optical reader 10. The optical reader 10 will be described primarily in the context of reading a bar code symbol 26, however it will be appreciated that the optical reader 10 can be used to read various types of optical indicia.

Figure 3:
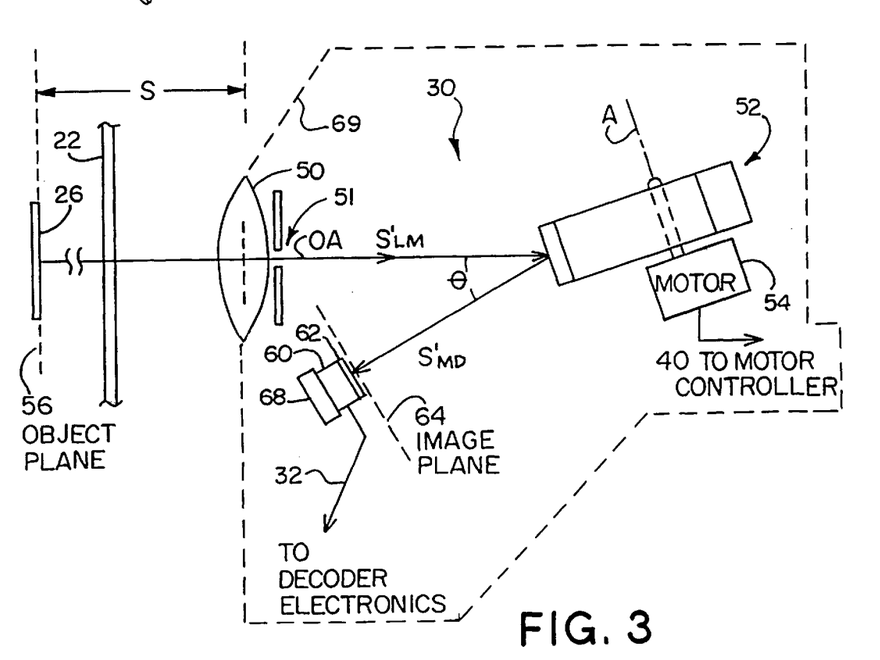
FIG. 3 is a partial schematic, plan view of the optical reader in accordance with the present invention.

As shown in FIG. 2, the optical reader 10 includes an optical head unit 30 which contains the appropriate optics as illustrated in FIG. 3 and described more fully below. The optical head unit 30 outputs an electrical signal based on the light received from the bar code symbol 26. Such output from the optical head unit 30 is provided on line 32 to a decoder 34. The decoder 34 is enabled by the trigger 18 and operates in conventional manner to correlate to the signal provided on line 32 and to decode the information included in the bar code symbol 26. Upon successfully decoding the bar code symbol 26, the decoder 34 provides the decoded information to a serial interface 36 which outputs the decoded information to a data terminal, computer, etc., via the electrical cable 24 or wireless transceiver or the like.

The optical reader 10 further includes a motor controller 40 for controlling a motor which rotates a mirrored spinner included in the optical head unit 30. In addition, the optical reader 10 includes a power supply 42 for providing the appropriate power to the respective elements within the optical reader 10. Such power supply 42 may consist of electrical power provided by the electrical cable 24. Alternatively, the power supply may include a rechargeable battery pack.

FIG. 3 is a plan view of the optical head unit 30 representing the optical orientation of the relevant components. The optical head 30 includes an imaging lens 50 for forming an image of the bar code symbol 26 through an aperture 51 adjacent the imaging lens 50. The size of the aperture 51 may be selected to provide a desired f# for the optic system as will be appreciated.

Figure 5:
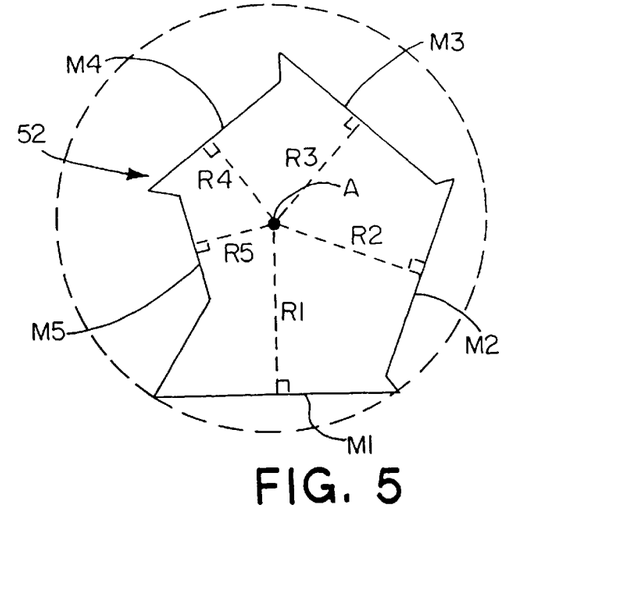
FIG. 5 is a top view of a multi-face rotating mirror used in accordance with the present invention.

In addition, the optical head 30 includes a mirrored spinner 52 rotated about an axis A by a motor 54. The mirrored spinner reflects the imaged light received from the imaging lens 50 towards a photodetector 60 included in the optical head unit 30. The mirrored spinner 52, shown in top view in FIG. 5, includes a plurality of mirrored faces (e.g., M1–M5) which extend parallel to the rotation axis A. As is shown in FIG. 5, each mirrored face M1–M5 is respectively positioned at a different radius (e.g., R1–R5) from the rotation axis A with the mirrored face M1–M5 oriented perpendicular to the corresponding radius R1–R5. In the exemplary embodiment, R1>R2>R3>R4>R5.

As will be described more fully below, the mirrored faces M1–M5 each being located at a different radius R1–R5 from the rotation axis A results in a variation in the object distance s between the imaging lens 50 and the object plane 56. Depending on which mirrored face M1–M5 is in optical series with the imaging lens 50 at a given moment in time, the object distance s will vary over time between a plurality of locations. This allows a bar code symbol 26 to be read by the optical reader 10 without requiring an operator to position the optical reader 10 at the same distance from a bar code symbol 26 each time a bar code symbol 26 is to be read.

In the exemplary embodiment, the mirrored spinner 52 has five faces M1–M5. However, it will be appreciated that in another embodiment a different number of faces may be used. Each face will result in the imaging of the bar code symbol 26 from a different object distance s, and depending on the desired range an appropriate number of faces may be included. Continuing to refer to FIG. 5, the mirrored spinner 52 may be weighted as needed in order to balance the weight of the spinner 52 about the rotation axis A.

Figure 4:
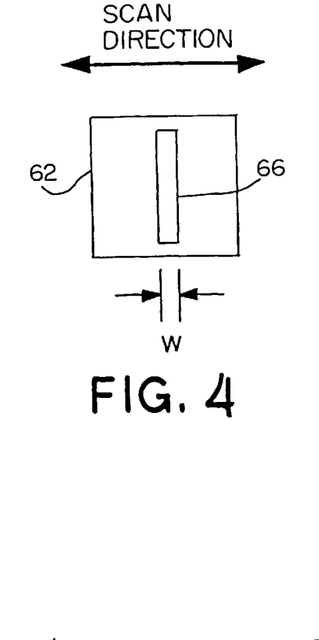
FIG. 4 is a schematic representation of a photodetector aperture in accordance with the present invention.

Returning to FIG. 3, the photodetector 60 is made up of a conventional element such as a photodiode for receiving light reflected by the mirrored spinner 52. The photodetector 60 is positioned with an aperture plate 62 at the image plane 64 of the optical head unit. According to the present invention, the image of the bar code symbol 26 is formed by the imaging lens 50 at the image plane 64. The rotation of a given mirrored face M1–M5 about the rotation axis A causes the image to sweep across the aperture plate 62 within the image plane 64. As shown in FIG. 4, the aperture plate 62 includes an aperture 66 having a width W which is less than the lowest expected bar width at the image plane 64. Accordingly, as the image of the bar code symbol 26 from a given mirrored face M1–M5 is swept across the aperture plate 62 as the mirrored spinner 52 rotates about the axis A, the output of the photodetector 60 will vary in relation to the presence of bars or spaces in the bar code symbol 26. The output from the photodetector 60 is provided via line 32 to the decoder 34 (FIG. 2) where it can then be processed in conventional fashion.

The photodetector 60 may have affixed thereto a Peltier cooler 68 for increasing the sensitivity of the photodetector 60. Although not necessary to the invention, the Peltier cooler 68 increases the sensitivity of the photodetector 60 such that the optical reader 10 can be used even under very low level lighting conditions. Such a cooler 68 is commercially available, for example, from Melcor, Trenton, N.J.

The optical head unit 30 preferably further includes a dark room type housing 69 (represented by dashed line) to prevent unwanted ambient illumination from reaching the photodetector 60. As a result, a high signal to noise ratio may be achieved. The dark room type housing 69 is made of lightweight opaque material such as plastic coated with black paint.

As shown in FIG. 3, the imaging lens 50 receives light from the bar code symbol 26 which theoretically is located an object distance s from the imaging lens 50. The mirrored spinner 52 is located along the optical axis OA of the imaging lens 50, but is tilted slightly by an angle θ. As a result, the optical path from the imaging lens 50 is reflected and thereby folded over by the respective mirrored face M1–M5 of the mirrored spinner 52 in order that the image of the bar code symbol 26 is formed at the image plane 64 adjacent to the photodetector 60.

It will be appreciated that the image distance s' between the imaging lens 50 and the image plane 64 includes the distance $s'_{LM}$ between the imaging lens 50 and the particular mirrored face M1–M5 which is in optical series with the imaging lens 50 at a given moment. In addition, the image distance s' includes the distance $s'_{MD}$ between the particular mirrored face M1–M5 and the image plane 64. As a result, the image distance s' can be represented as follows:

$$s' = s'_{LM} + s'_{MD}$$

Of course, the distance $s'_{LM} + s'_{MD}$ will change as a function of which particular mirrored face M1–M5 is functioning to reflect light from the imaging lens 50 as the mirrored spinner 52 rotates during a reading operation. By selecting the appropriate radii R1–R5 for the respective mirrored faces and by positioning the mirrored spinner 52 a predetermined distance $s'_{LM}$ from the imaging lens 50, the mirrored spinner 52 can provide up to m predefined image distances s', where m is the number of faces on the mirrored spinner (e.g., five).

According to the lens formula, $$1/s + 1/s' = 1/f$$

where s is the object distance, s' is the image distance, and f is the focal length. In the exemplary embodiment, the focal length f of the imaging lens 50 is fixed based on the selection of a particular lens. By selecting different values for the image distance s' as determined by the particular values of $s'_{LM} + s'_{MD}$ for the respective mirrored faces M1–M5, for example, different object distances s are obtained by the optical reader 10. Using, as an example, an imaging lens 50 with a focal length of 28 mm, the following object distances $s_1$–$s_5$ as set forth in the following table can be obtained.

TABLE

| Mirrored Face | $s'_{LM} + s'_{MD}$ (mm) | s (mm) |
|---|---|---|
| M1 | 20 | $s_1 = 69$ |
| M2 | 23 | $s_2 = 128$ |
| M3 | 25 | $s_3 = 232$ |
| M4 | 26 | $s_4 = 362$ |
| M5 | 28 | $s_5 = \infty$ |

Figure 6:
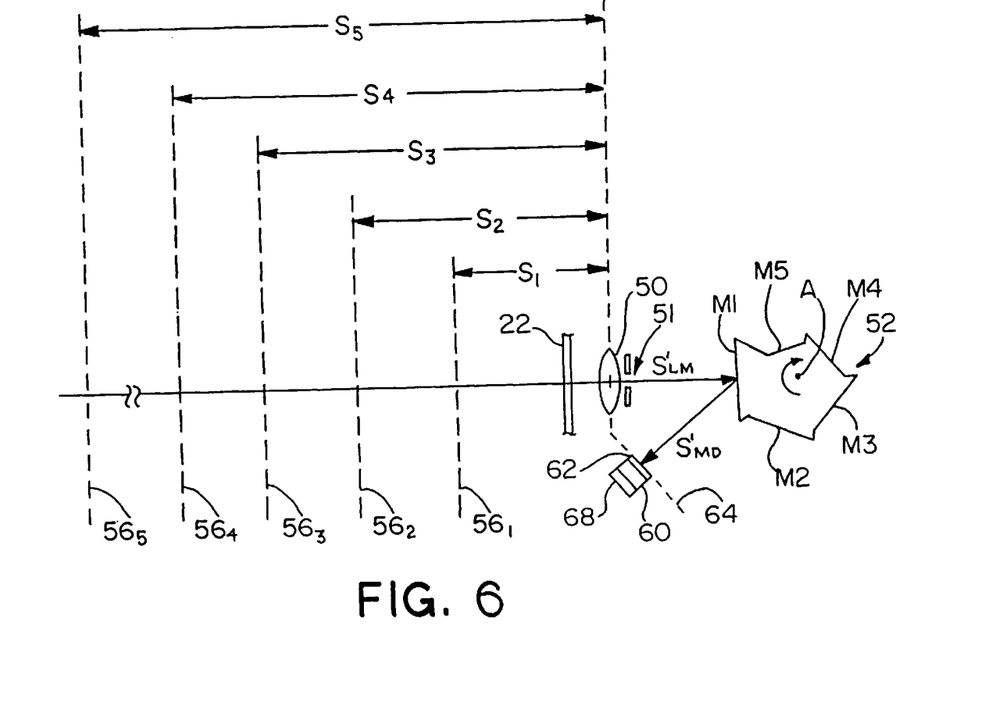
FIG. 6 is a schematic diagram of the optical head unit in relation to the resultant object plane distance in accordance with the present invention.

FIG. 6 illustrates the manner in which the rotation of the mirrored spinner 52 alters the object distance of the optical reader 10 between $s_1$–$s_5$ as the spinner 52 rotates in addition to causing the image of the bar code symbol 26 to be swept across the photodetector 60. The speed of rotation of the mirrored spinner 52 is controlled so as to enable the decoder 34 to have adequate time to process the signal from each mirrored face M1–M5 before encountering the next mirrored face. An exemplary rotational speed of the spinner 52 may be 360 rpm (or scans per second) using conventional decoders.

In operation, the bar code symbol 26 is not likely to be located at the exact location of one of the image planes $56_1$–$56_5$ formed by the respective mirrored faces M1–M5. However, the minimum object distance (e.g., $s_1$) and the maximum object distance (e.g., $s_5$) can be selected to encompass the minimum and maximum distances at which the optical reader 10 will be expected to read the bar code label 26. In addition, a sufficient number of intermediate object planes (e.g., associated with object distances $s_2$–$s_4$) may be selected by the use of a corresponding number of mirrored faces on the mirrored spinner 52 at respective radii.

Although the bar code symbol 26 will not be precisely in focus at the image plane 64 unless it is located exactly at one of the specified object distances $s_1$–$s_5$, the optical elements and distances are selected such that at least one of the mirrored faces will result in the bar code symbol 26 being imaged at the image plane 64 with sufficient resolution or focus to allow the image to be decoded by the decoder 34. In this sense, the decoder 34 is continuously attempting to decode the output of the photodetector 60 as the mirrored spinner 52 rotates. As long as one of the mirrored faces M1–M5 results in the bar code symbol 26 being imaged at the image plane 64 with sufficient resolution, the bar code symbol 26 may be read and decoded. The images without sufficient resolution which may result from the other mirrored faces are in essence ignored by the decoder 34 as a result of the inability to decode the output of the photodetector 60.

By selectively choosing the number of mirrored faces and the respective image distances s', the probability that at least one of the images of the bar code symbol 26 will be successfully decoded regardless of its exact position relative to the optical reader 10 is quite high. Even still, if an operator has difficulty getting the optical reader to decode the bar code symbol 26, the operator may be instructed to move the optical reader 10 slightly towards or away from the bar code symbol. Because the optical reader 10 varies its object distance as a result of the mirrored spinner 52, the bar code symbol 26 may be quickly imaged and decoded.

Figure 7:
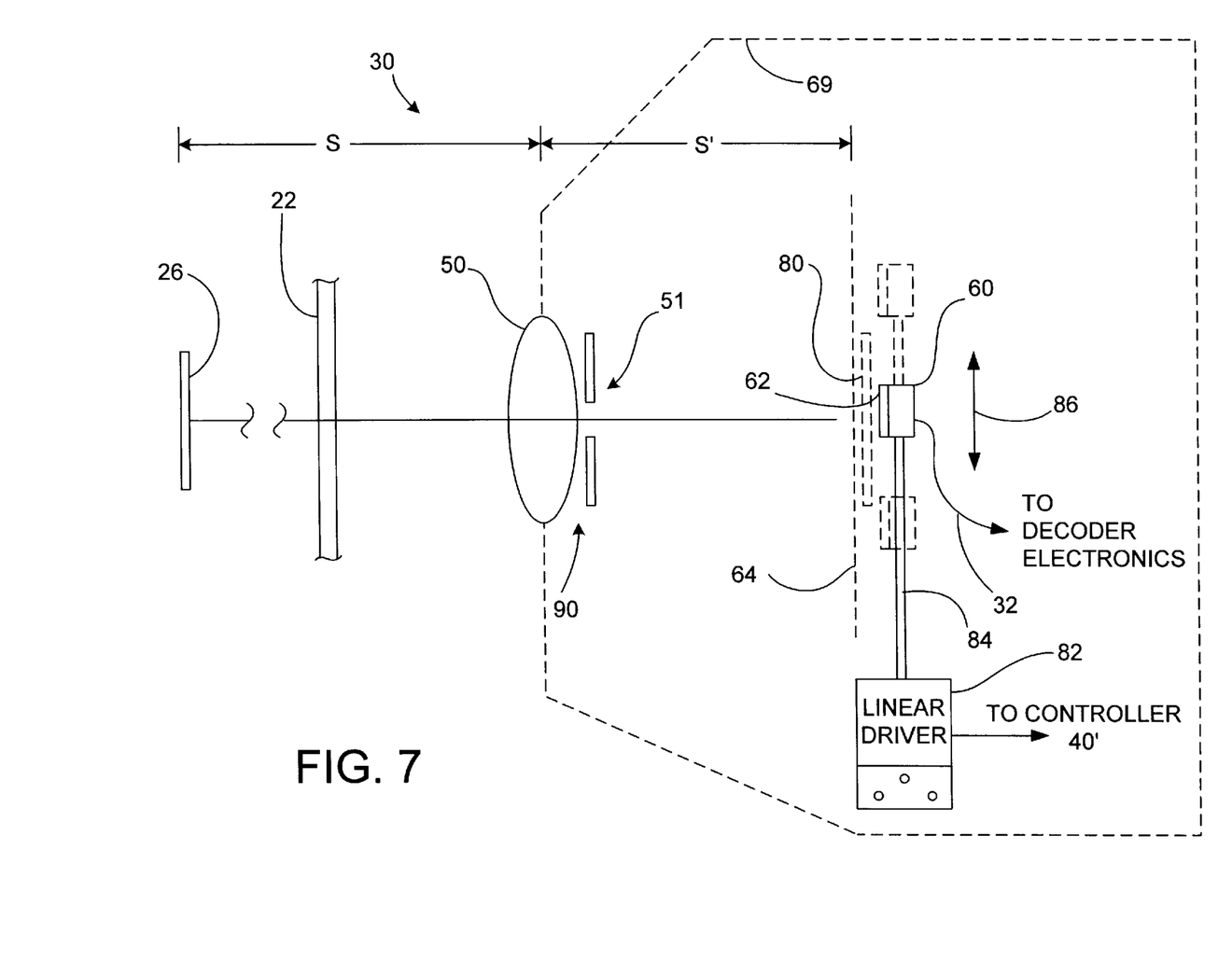
FIG. 7 is a partial schematic, plan view of the optical reader in accordance with a second example of the present invention.

FIG. 7 represents another example of the present invention in which relative movement occurs between the photodetector aperture and the optical indicia image. The example of FIG. 7 differs from the previous example of FIGS. 1–6 in that movement is effected using a fixed image. The optical head unit 30 instead physically moves the photodetector aperture relative to the image.

More particularly, in the example of FIG. 7 the mirrored spinner 52 is omitted and is replaced by a displacement mechanism which causes the photodetector 60 to be moved back and forth along the image plane 64 of the imaging lens 50. In this example, the imaging lens 50 has a wide focusing range as is discussed in more detail below. The wide focusing range of the imaging lens 50 allows for an image 80 of the bar code symbol 26 to be formed at the image plane 64 with acceptable resolution at object distances within a range of 5 inches to 18 inches, for example.

The optical head unit 30 includes a linear driver 82 positioned adjacent the image plane 64 as is shown in FIG.

7. The linear driver 82 has attached thereto a rod 84. The linear driver 82 drives the rod 84 in a reciprocating manner parallel with the image plane 64 as represented by arrow 86. The photodetector 60 with its aperture plate 62 is attached to the distal end of the rod 84. The aperture plate 62 is positioned such that the orientation of the slot like aperture 66 (FIG. 4) is parallel with the bars and spaces in the image 80 of the bar code symbol.

Although shown with a small degree of separation in FIG. 7 in order to facilitate understanding, the aperture plate 62 preferably is positioned so as to lie within the image plane 64. As the linear driver 82 causes the aperture plate 62 and photodetector 60 to move back and forth along the image plane 64, the aperture 66 will be swept across the image 80 within the image plane 64. The range of movement of the aperture 66 along the image plane 64 preferably is sufficient to extend beyond the expected maximum endpoints of the image 80 as represented in phantom in FIG. 7.

Figure 8:
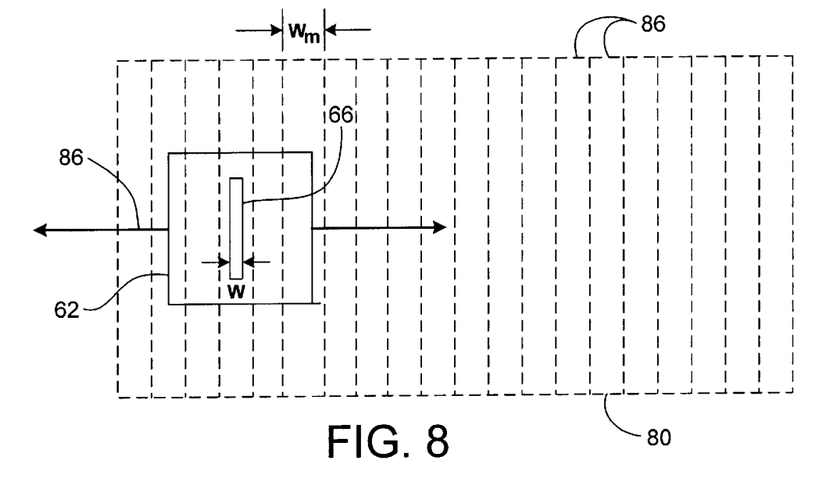
FIG. 8 is a schematic view representing movement of the photodetector relative to the image plane in accordance with the present invention.

FIG. 8 represents the movement of the aperture 66 across the image 80 in the image plane 64. The minimum expected width of a given bar or space 86 in the image 80 is represented by $w_m$. Again, the width W of the aperture 66 preferably is designed so as to be less than the minimum expected width $w_m$. As the aperture 66 moves along the image 80 in a given direction, the output of the photodetector 60 will vary with respect to time depending upon whether the aperture 66 is located within a bar or a space 86. The output is provided to the decoder electronics 34 (FIG. 10) where it is processed and decoded in conventional fashion. Because of the reciprocating movement of the rod 84, the aperture 66 can make several passes across the entire image 80 in a relatively short period of time. The decoder electronics 34 thus has several opportunities to decode the image 80 as is conventional.

The linear driver 82 in the exemplary embodiment is made up of a voice coil. One end of the rod 84 is coupled to and supported by the diaphragm of the voice coil, with the other end of the rod 84 including the photodetector 60 as noted above. Electronic circuitry within the linear driver 82 excites the voice coil with an oscillating signal having a frequency convenient to the processing carried out by the decoder electronics 34.

Referring back to FIG. 7, the imaging lens 50 in the exemplary embodiment is a bi-aspherical lens with a focal length of 4.6 millimeters (mm) and a diameter of 6.4 mm. The image distance s' varies over a range of approximately 160 microns for objects at an object distance s ranging from approximately 5 inches to 18 inches. The image size for the farthest focus, at 18 inches, is 390 microns. At the near focus of 5 inches, the image size is 1.4 mm. Thus, the image resolution at the photodetector aperture 66 has been found to remain sufficient for decoding throughout the range of 5 to 18 inches. Moreover, the maximum required movement of the photodetector aperture 66 which is initially centered relative to the image is only 0.7 mm which is easily achievable using a voice coil for the linear driver 82. Another suitable imaging lens is commercially available from Thorlabs, Part Number CAX 183, with a focal length of 18.3 mm and a numerical aperture of 0.12.

Using a typical bar code label 26 located 18 inches away (i.e., s=18") as a guide, the thinnest bar in the bar code image 80 will be 3 microns in thickness at the image plane 64. Accordingly, the width w of the aperture 66 (FIG. 8) in the aperture plate 62 is designed to be 3 microns or less. In the exemplary embodiment, the aperture plate 62 may be formed directly on the face of the photodetector 60 using photolithography techniques, for example. Known techniques permit formation of feature sizes (e.g., apertures) of 3 microns or less. A layer of metal or some other opaque material is initially formed on the face of the photodetector 60. The layer is thereafter patterned and etched to form the aperture 66.

As is shown in FIG. 7 and in the figures for the other examples described herein, each of the examples includes a dark room type housing 69 (as in FIG. 2) for preventing outside light from entering the housing 12 and being incident on the photodetector 60 except via the lens 50.

Figure 9:
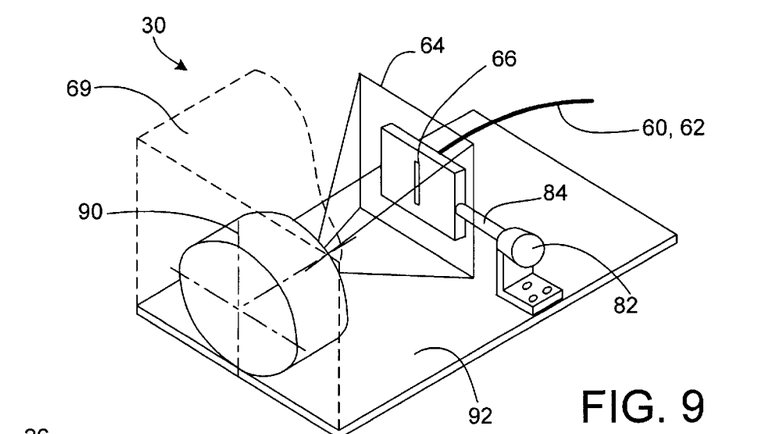
FIG. 9 is a schematic perspective view of the optical reader in accordance with the second example.

FIG. 9 represents a perspective view of the optical head unit 30 in accordance with the example of FIG. 7. The optics 50, 51 are collectively represented as 90 and are fixedly attached to a mounting plate 92 as shown. Also fixedly mounted to the plate 92 is the linear driver 82. As is shown, the aperture 66 is located approximately at the image plane 64 and moves in a reciprocating manner along the image plane. The dark room type housing 69 is illustrated in phantom and cut away in order to show the components therein. The entire assembly shown in FIG. 9 fits within the housing 12 illustrated in FIG. 1.

Figure 10:
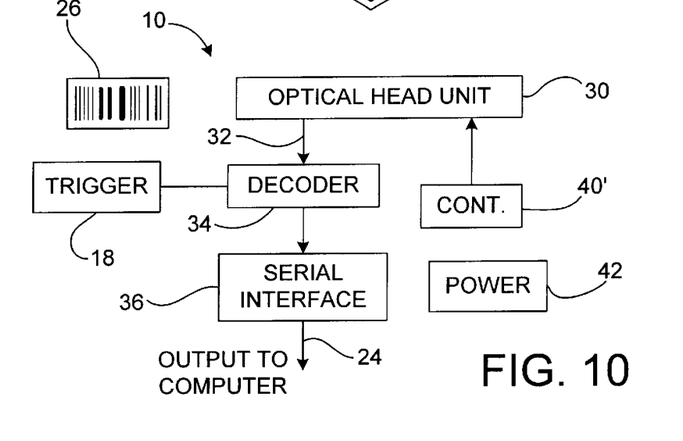
FIG. 10 is a system level block diagram of the optical reader used in accordance with the second thru fifth examples of the present invention.

FIG. 10 is a block diagram of the optical reader representing the example of FIG. 7 and the subsequent examples discussed herein. The optical reader is essentially the same as that discussed above with respect to FIG. 2 with the exception that the motor controller 40 has been replaced by a linear driver controller 40' for controlling the linear driver 82. For example, the controller 40' may cause a periodic signal such as a triangle wave to be provided to the voice coil within the linear driver 82 for purposes of providing the reciprocating motion of the aperture 66 as discussed above.

Figure 11:
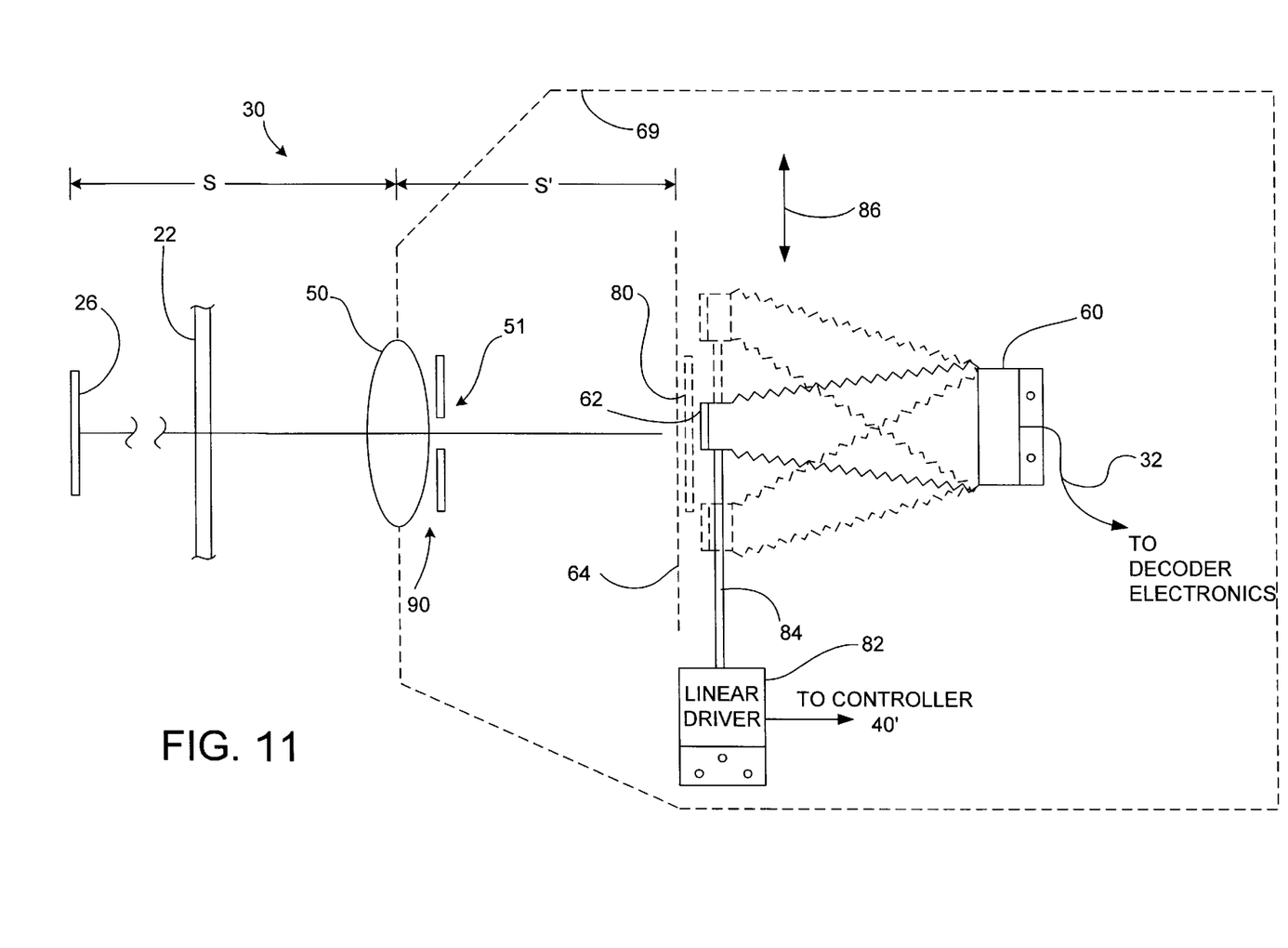
FIG. 11 is a partial schematic, plan view of the optical reader in accordance with a third example of the present invention.
Figure 12:
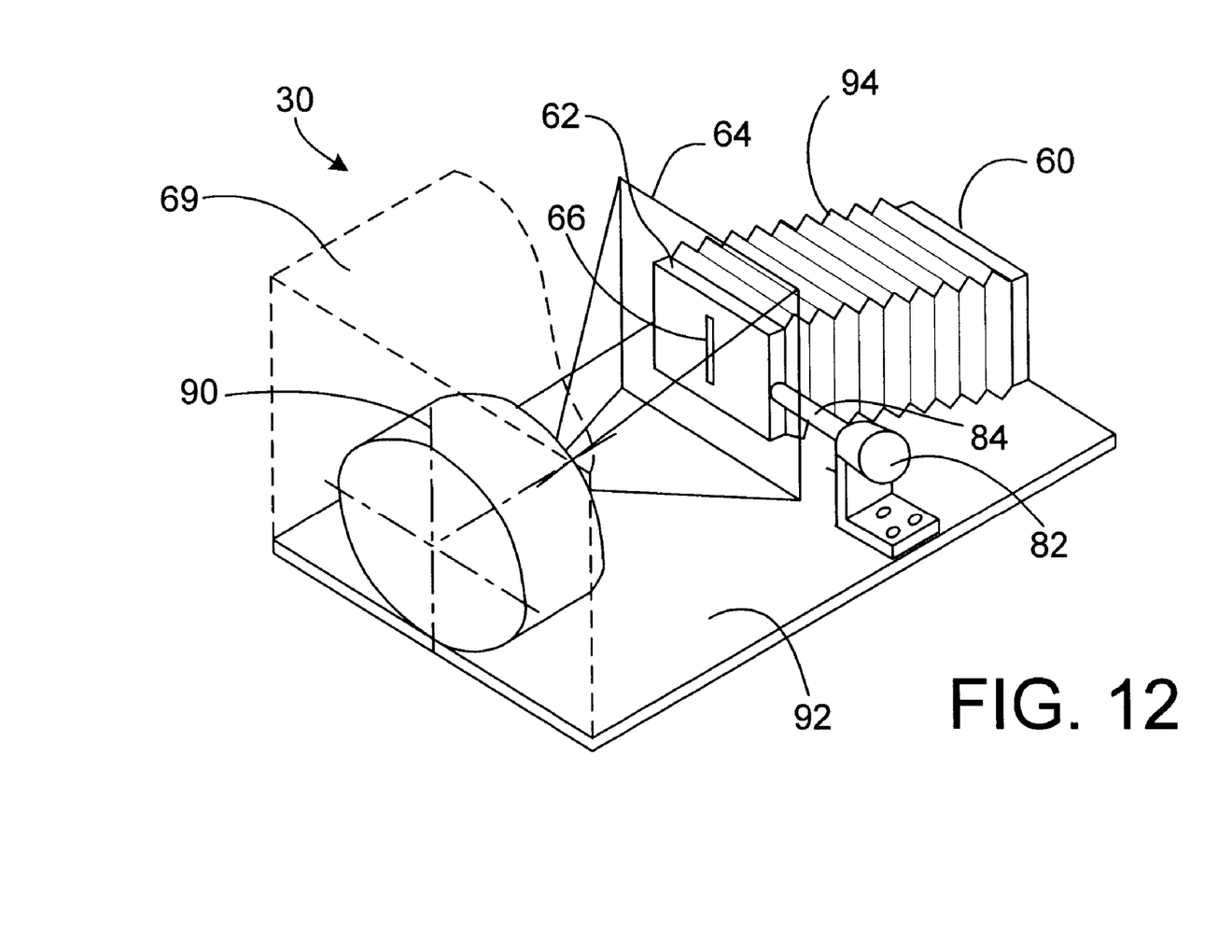
FIG. 12 is a schematic perspective view of the optical reader in accordance with the third example.

FIGS. 11 and 12 illustrate a third example of the optical reader in accordance with the invention. The example in FIGS. 11 and 12 is the same as that described above with respect to FIG. 7 except that the photodetector 60 is fixedly attached to the plate 92 in front of the optics 90. Only the aperture plate 62 with its aperture 66 are mounted to the distal end of the reciprocating rod 84. A small, flexible, opaque inner dark room enclosure 94 is mounted between the back side of the aperture plate 62 and the face of the photodetector 60. The enclosure 94 is provided to ensure that only light which passes through the aperture 66 reaches the face of the photodetector 60.

The inner dark room enclosure 94 preferably is made of a thin flexible plastic or the like which easily extends/flexes between the maximum ranges of movement of the rod 84. The linear driver 82 moves the rod 84 back and forth so that the aperture 66 is moved back and forth along the image plane 64. Light which passes through the aperture 66 is incident on the stationary photodetector 60. The output of the photodetector 60 may then be decoded as in the other examples.

Figure 13:
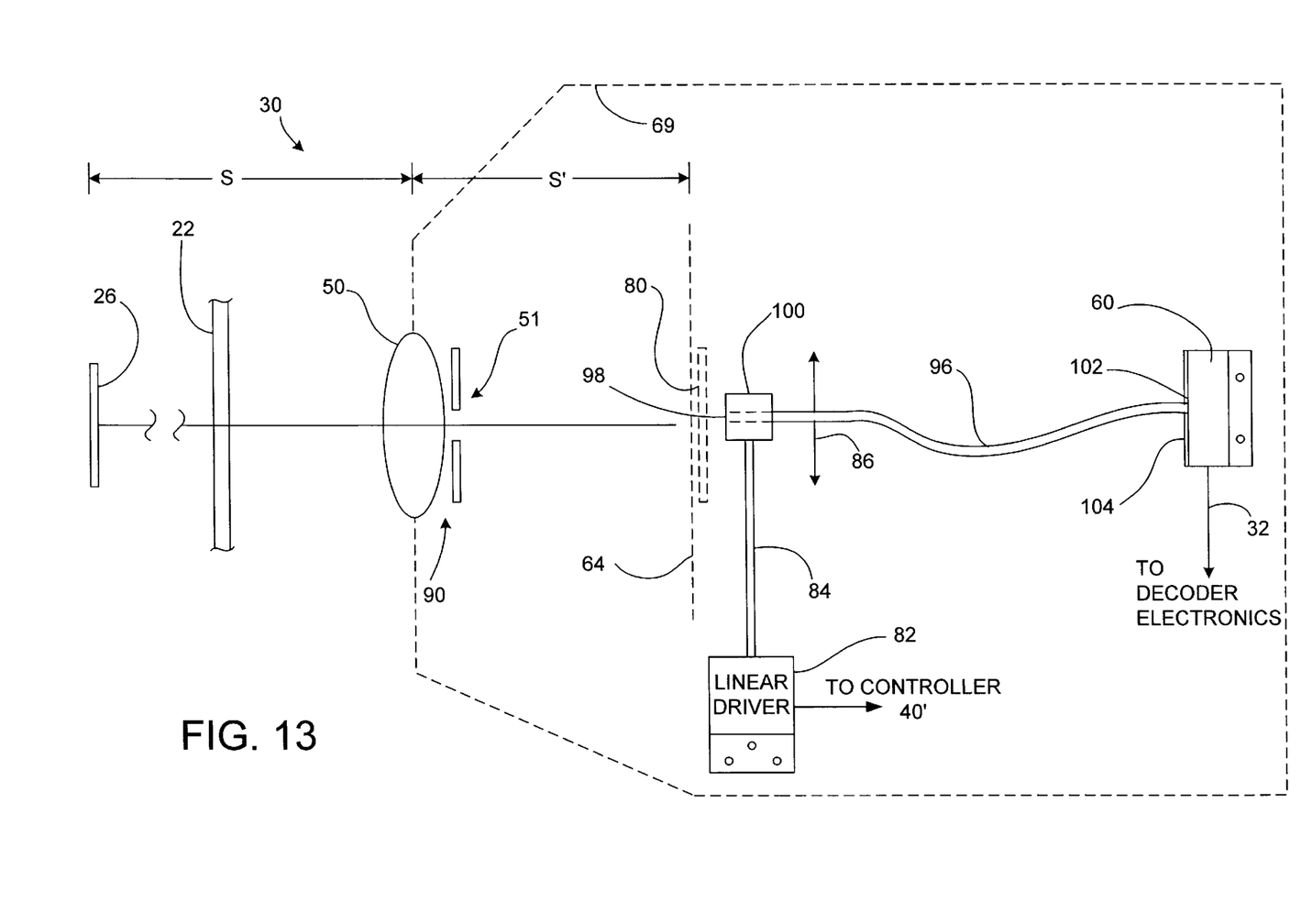
FIG. 13 is a partial schematic, plan view of the optical reader in accordance with a fourth example of the present invention.
Figure 14:
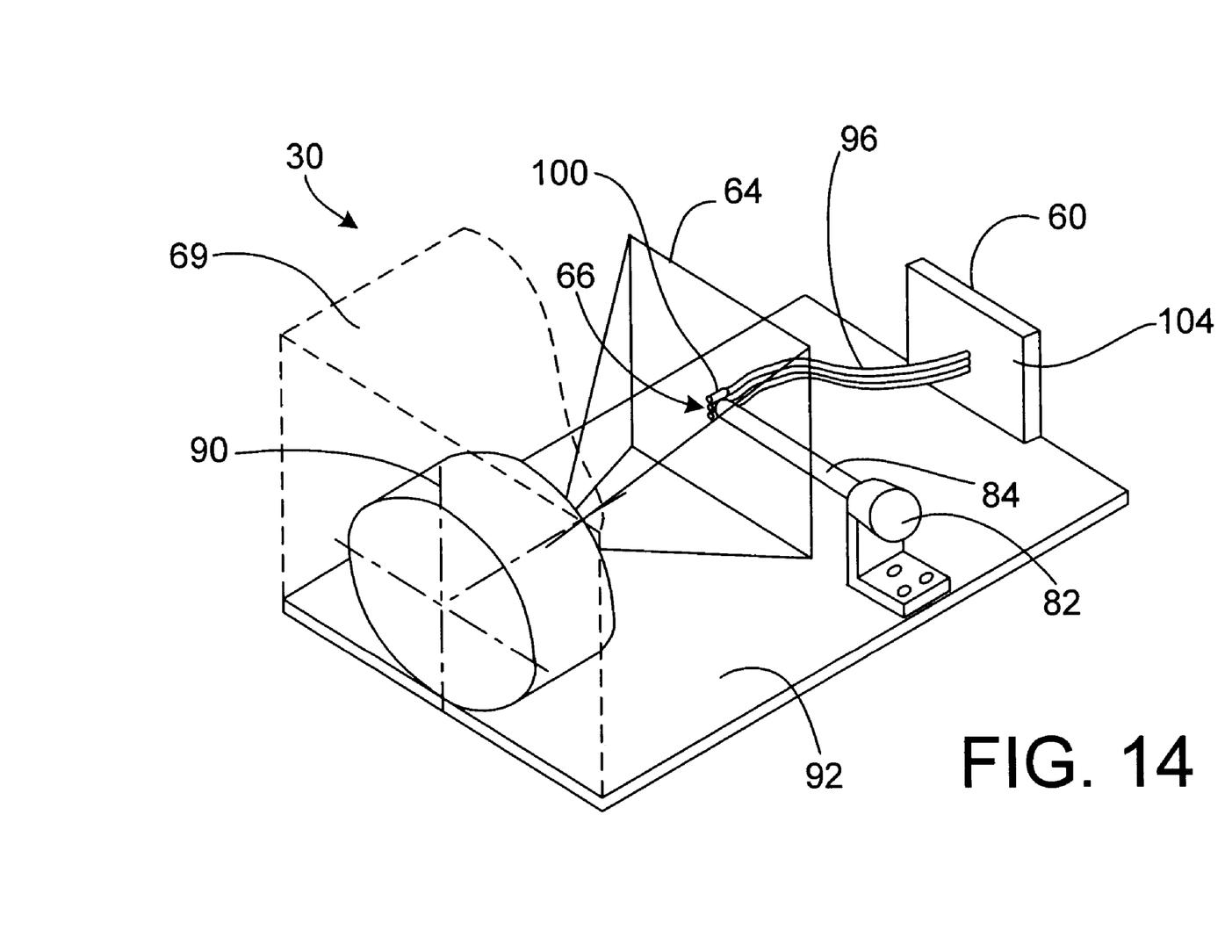
FIG. 14 is a schematic perspective view of the optical reader in accordance with the fourth example.

FIGS. 13 and 14 show a fourth example of an optical reader. This example is similar to the example of FIGS. 11 and 12, except that the aperture plate 62 and dark room enclosure 94 are replaced by a bundle of optical fibers 96. The receiving ends 98 of each of the optical fibers 96 are held within a holding block 100 mounted to the end of the reciprocating rod 84. The receiving ends 98 of the optical fibers 96 preferably are bundled so as to form collectively a self defined aperture 66 having the same approximate dimensions as the aperture 66 discussed in the previous embodiments.

Light at the image plane 64 which is incident on the ends 98 is transmitted through the fibers 96 to the photodetector 60. The ends 102 of the optical fibers 96 are coupled to the face of the photodetector 60 so that the light received at the image plane 64 is transferred by the optical fibers 96 to the photodetector 60. A mask 104 covers any portion of the face of the photodetector 60 which would otherwise receive light other than from the optical fibers 96. Since the optical fibers 96 are extremely flexible, they can easily flex throughout the entire range of movement of the holding block 100.

Figure 15:
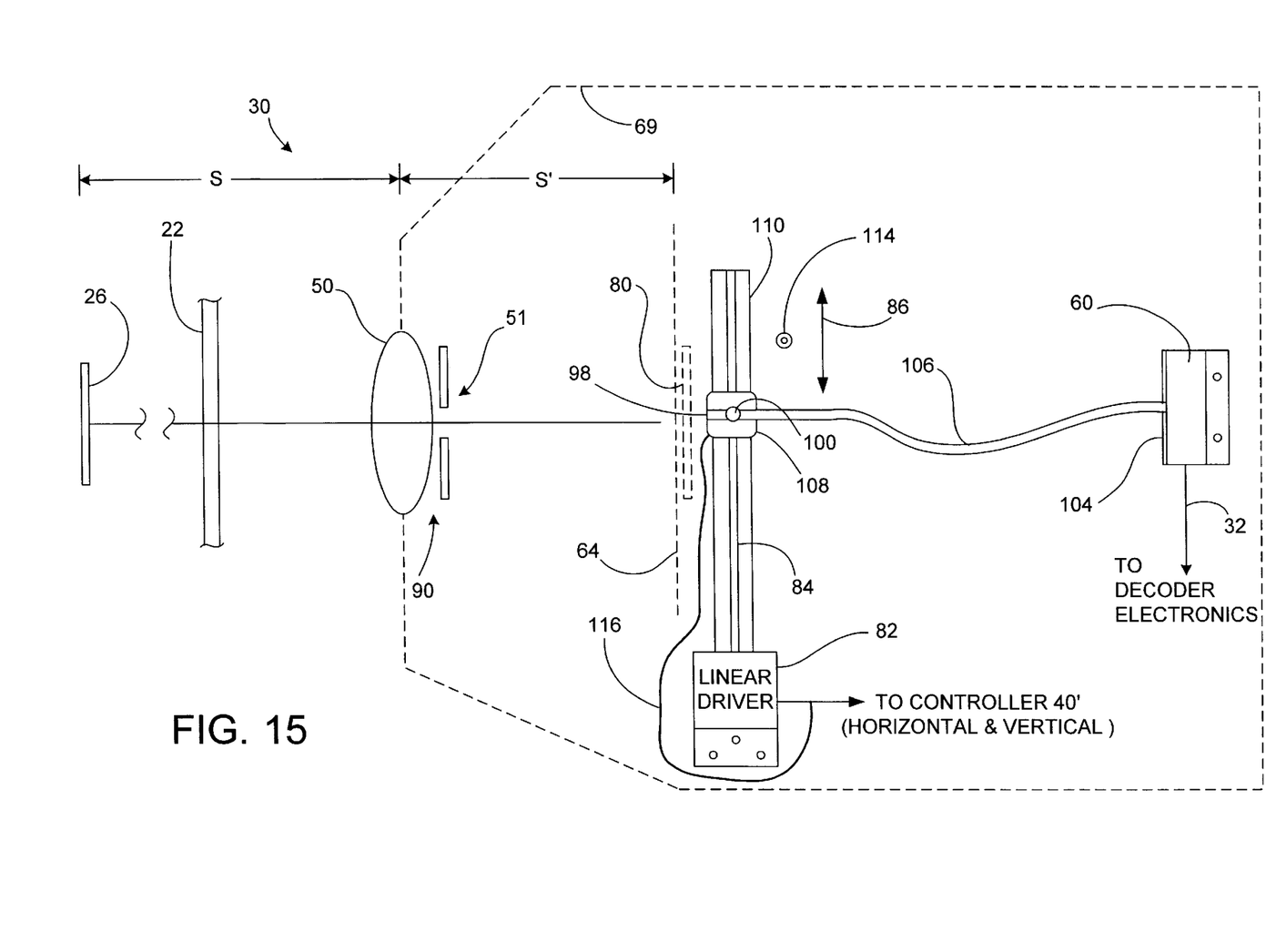
FIG. 15 is a partial schematic, plan view of the optical reader in accordance with a fifth example of the present invention.
Figure 16:
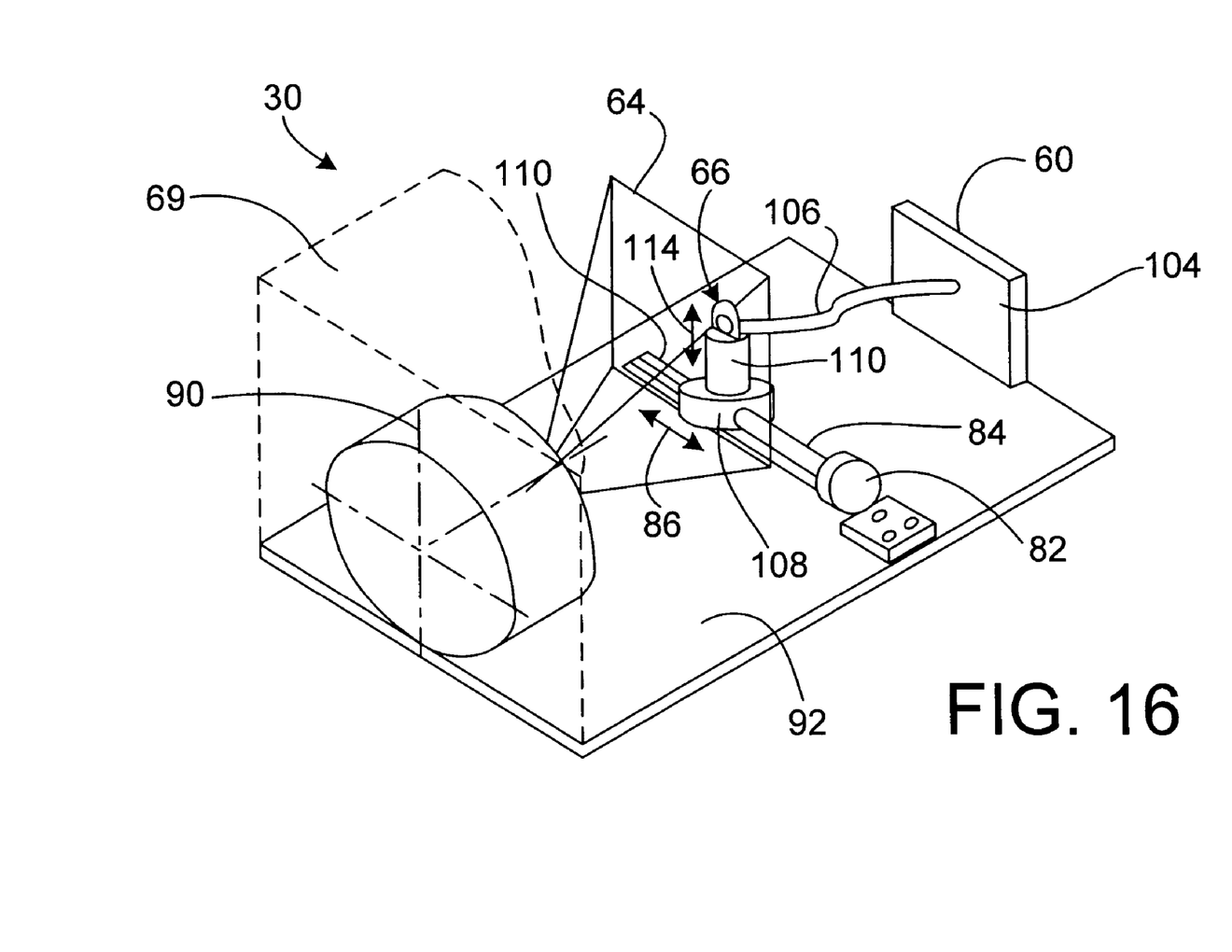
FIG. 16 is a schematic perspective view of the optical reader in accordance with the fifth example.

The example of FIGS. 15 and 16 is similar to the example of FIGS. 13 and 14, except that a single optical fiber or bundle of optical fibers 106 is driven in a raster pattern across the image plane 64 to obtain a 2 dimensional image. The linear driver 82 provides horizontal movement and a second linear driver 108 is included for providing vertical movement.

As shown most clearly in FIG. 16, the end of the reciprocating rod 84 of the linear driver 82 is attached to the base of the linear driver 108. The linear driver 108 is freely movable by the rod 84 in the horizontal direction 86. For example, the linear driver 108 may be slidably mounted within a guide rail 110 which allows the linear driver 108 to slide freely in the horizontal direction. The rod 84 from the linear driver 82 controls the horizontal position of the linear driver 108.

The linear driver 108 is constructed similar to the linear driver 82 and has its own reciprocating rod 112. The linear driver 108 provides movement of the rod 112 in a vertical direction represented by arrow 114. Attached to the distal end of the rod 112 is a holding block 100 which holds the receiving end 98 of the optical fiber or fibers 106. As in the previous example, the end or ends 98 are held approximately at the image plane 64 facing the lens 50.

Consequently, the rod 112 controls the vertical position of the end or ends 98 of the optical fibers 106 and the rod 84 ultimately controls the horizontal position. Each of the linear drivers 82 and 108 is controlled by the controller 40' so as to result in the end or ends 98 scanning the image plane 64 in a raster pattern in the area of the image 80. The linear driver 108 is coupled to the controller 40' in part by a flexible cable 116 which permits for movement of the linear driver 108 as will be appreciated.

Again, the end or ends 98 of the optical fibers 106 form a self defined aperture. Light which is received thereby is coupled to the photodetector 60 where it is detected and processed as a 2D image by the decoder electronics 34 using conventional techniques. The end or ends 98 are bundled together in this example to form an aperture which is smaller in both width w and height than the smallest feature expected in the image 80 of the optical indicia 26. Since scanning will occur in two dimensions, it is desirable for the height of the aperture also to be on the order of 3 microns, for example, as will be appreciated.

Figure 17:
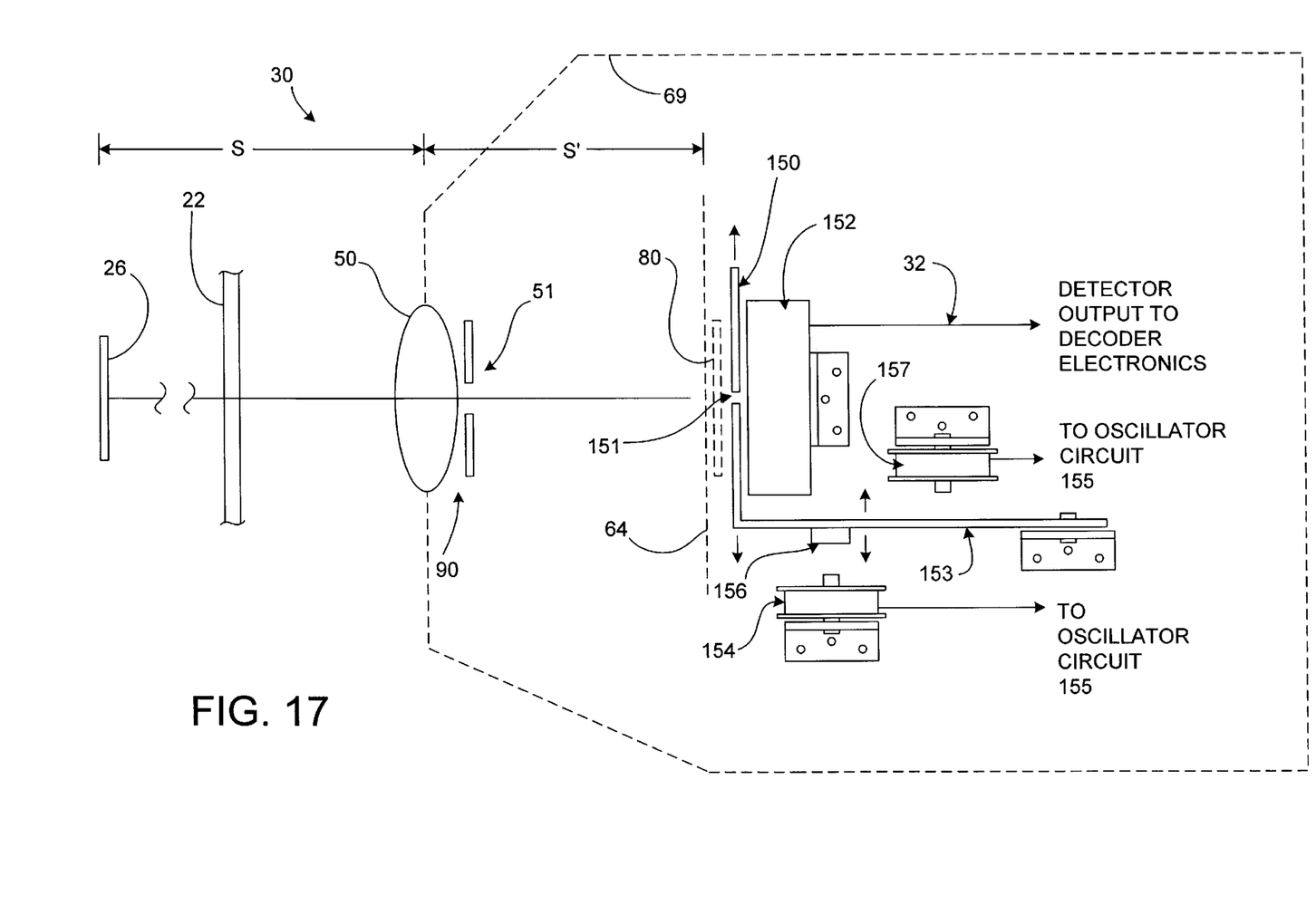
FIG. 17 is a partial schematic, plan view of the optical reader in accordance with a sixth example of the present invention.
Figure 18:
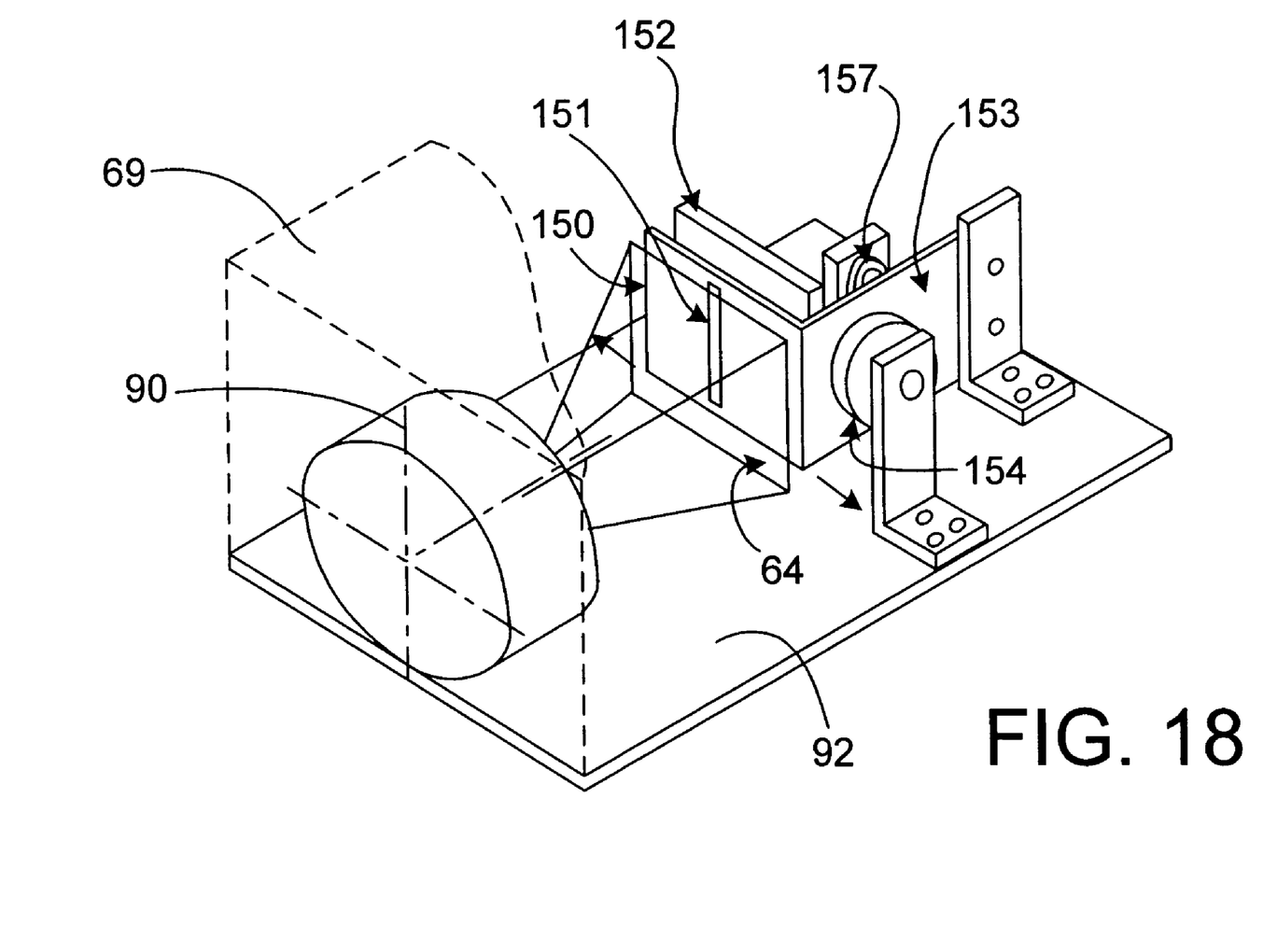
FIG. 18 is a schematic perspective view of the optical reader in accordance with the sixth example.

In another embodiment of this invention, the bar code or other optical indicia is imaged onto a photodiode detector of sufficient length and width to include the entire image within its active area. As shown in FIGS. 17 and 18, an opaque mask 150 with a narrow vertical slit 151 is respectively scanned back and forth in front of the large-area detector 152 (such as the Model OSD35-LR produced by Centronic, Inc. of Newbury Park, Calif.) by means of a vibrating leaf spring 153. The width of the scanned slit 151 is approximately equal to the image width of narrowest bar allowed in the bar code, typically on the order of 3 microns as in previous embodiments, so that no more than that one light or dark bar can be seen by the detector 152 at any instant. As the slit is scanned across the detector face, the light intensity sensed by the detector varies in time in accordance with the light and dark bars of the indicia. The resulting electrical output signal of the detector in this embodiment is identical in form to that produced by the previous embodiment employing a scanned fiber optical handle.

The optical system 90 that produces the image on the detector is also similar to the previous embodiment, consisting of a protective window 22, an imaging lens 50 followed by a limiting aperture 51 which produces an optical image 80 at the face of the detector 152.

The vibrating leaf spring 153 is driven at approximately its natural resonant frequency by means of an electromagnetic coil 154. An electronic oscillator circuit 155 provides an alternating drive current to the coil 154 which in turn produces an alternating magnetic field of the same frequency and waveform as the drive current. This waveform can be sinusoidal, triangular or some other format selected to optimize the time-varying detector output signal for electronic signal processing. The alternating magnetic field couples to the leaf spring 153 by means of the ferromagnetic properties of a steel leaf spring or a small permanent magnet 156 attached to a non-metallic spring.

To reduce the effect of changes in the natural resonant frequency of the leaf spring 153 caused for instance by temperature variation, a second coil 157 can be used to sense the amplitude response of the vibrating spring 153 and correct the frequency of the drive current to match the changing natural resonant frequency.

In each of the above described examples, ambient light is relied upon for producing an image of the bar code 26 or other optical indicia. It will be appreciated, however, that a lighting system could also be used in conjunction with the present invention to illuminate the bar code or other indicia. For example, the housing 12 (FIG. 1) may also include a set of small lights (not shown) around the window 22. Such lights are designed to illuminate the bar code 26 when the reader is aimed thereat. The set of small lights may be made up of a light-emitting diode (LED) array, for example. The individual LEDs preferably are infrared LEDs, which can result in higher signal-to-noise ratios than other light sources or ambient light.

Although the invention has been shown and described with respect to certain preferred embodiments, it is obvious that equivalents and modifications will occur to others skilled in the art upon the reading and understanding of the specification. The present invention includes all such equivalents and modifications, and is limited only by the scope of the following claims.

What is claimed is:

1. An optical reader for reading optical indicia, comprising:
    an imaging element for forming an image of the optical indicia at an image plane;
    an aperture positioned at the image plane and having a width smaller than the width of a smallest element in the image to be discerned by the optical reader, the aperture permitting illumination from a portion of the image to impinge upon a photodetector; and
    a displacement system which produces relative movement between the image and the aperture to produce an output of the photodetector indicative of the optical indicia.

2. The optical reader of claim 1, further comprising a dark room enclosure for preventing light from being incident on the aperture except for light which passes through the imaging element.

3. The optical reader of claim 2, wherein the displacement system comprises a rotating mirror element.

4. The optical reader of claim 2, wherein the imaging element comprises an imaging lens.

5. The optical reader of claim 2, wherein the optical indicia is a bar code symbol and the width of the aperture is less than the width of the smallest bar width in the image.

6. The optical reader of claim 2, wherein a position of the image in the image plane is fixed relative to a position of the imaging element, and the displacement system moves the aperture along the image plane proximate the image.

7. The optical reader of claim 6, wherein the aperture is fixedly attached to the photodetector and the displacement system moves the photodetector together with the aperture.

8. The optical reader of claim 7, wherein the aperture comprises a narrow slot formed on a face of the photodetector.

9. The optical reader of claim 6, wherein a position of the photodetector is fixed relative to the position of the imaging element, and light received by the aperture is coupled to the photodetector by flexible light transmission means.

10. The optical reader of claim 9, wherein the flexible light transmission means comprises a dark room enclosure coupled between the aperture and the photodetector.

11. The optical reader of claim 9, wherein the flexible light transmission means comprises at least one optical fiber.

12. The optical reader of claim 11, wherein the displacement system produces the relative movement in at least two dimensions.

13. The optical reader of claim 2, wherein the displacement system comprises a voice coil having the aperture coupled to its diaphragm.

14. The optical reader of claim 2, wherein the displacement system produces the relative movement in at least two dimensions.

* * * * *